C. T. HARVEY.
Railroad.
No. 56,411.
Patented July 17, 1866.
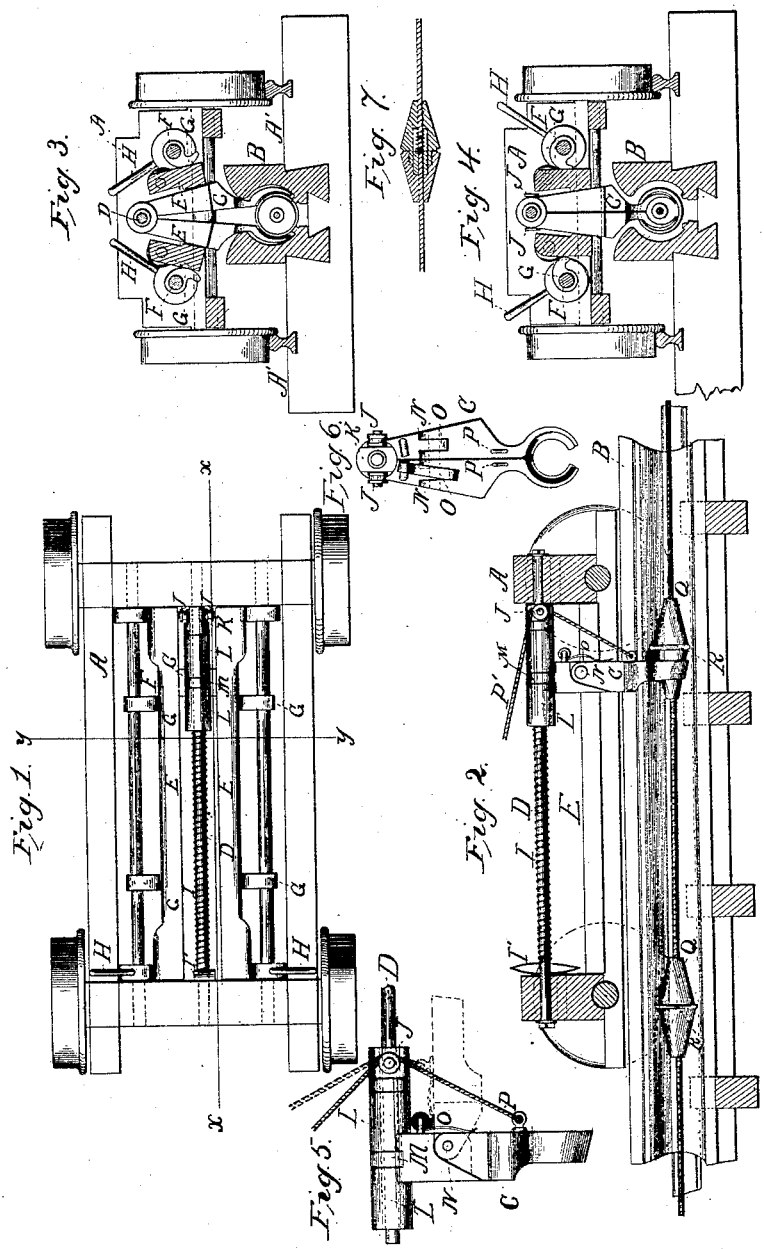

UNITED STATES PATENT OFFICE.

CHARLES T. HARVEY, OF TARRYTOWN, NEW YORK.

IMPROVEMENT IN RAILROADS.

Specification forming part of Letters Patent No. 56,411, dated July 17, 1866.

*To all whom it may concern:*

Be it known that I, CHARLES T. HARVEY, of Tarrytown, county of Westchester, State of New York, have invented a new and useful Improvement in Propelling or Moving Cars and other Vehicles; and I do hereby declare that the following is a full, clear, and exact description thereof, which will enable others skilled in the art to make and use the same, reference being had to the accompanying drawings, forming part of this specification, in which—

Figure 1 is a plan of a railway-truck to which my improvement is applied. Fig. 2 is a vertical longitudinal section in the plane of the line $xx$, Fig. 1. Fig. 3 is a cross-section in the plane of the line $yy$, Fig. 1, the clutch C being shown open. Fig. 4 is a like cross-section in the plane of the line $y$, Fig. 1, the clutch being shown closed. Fig. 5 is a side view of the clutch detached from the truck. Fig. 6 is a front view of the clutch detached from the truck.

This invention relates to that method of moving vehicles in which the propelling force is transmitted through a cable or chain moved by a stationary engine or other motor.

The invention is here illustrated by showing its application to the truck of a railway-car; and it is also applicable to all forms and kinds of vehicles, whether intended for railways or for common roads, and also to the trucks of agricultural machines.

It consists of several particulars, among which is a coupling-clutch for connecting the truck of a car or other vehicle at pleasure to a propelling-cable without violent shocks or jars, the clutch being in this example adapted to be used with a cable-guide like that described in an application heretofore made by me and now pending in the Patent Office for a method of propelling cars by a rope or chain.

The letter A designates the truck of a railway-car whose wheels rest and run on rails A'.

The wheels and rails may be varied from the form here shown at the pleasure of the maker without interfering with the carrying out of my invention.

B is an open cable-guide, of the general form and character of that shown in my former application above referred to. It is here placed centrally between the rails A', and consequently the clutch C, which works in conjunction with it and establishes the desired connection between the moving cable and the car, is placed centrally between the wheels; but both the guide and the clutch may be placed at one side of such central line, if desired.

The clutch is made in two parts, which are brought together after the manner of a hinge, their backs L and M being interlocked and hinged, so as to be capable of swinging and also of sliding endwise on a rod, D, whose ends are firmly and permanently secured in the ends of the frame of the truck.

A spiral spring, I, is placed on the rod before the clutch, one end coming against the clutch and the other against an elliptical spring, I', placed on the rod next to the cross-beam which forms the forward end of the frame of the truck. These springs constantly press the clutch toward the rear of the truck, against which it may come when it is disconnected from the cable, and they receive the shock produced when connection is made with the moving cable, and prevent injury to the vehicle and the apparatus, and also prevent injury and inconvenience to passengers or to freight carried on the vehicle.

Any other suitable arrangement of springs may be adopted in connection with the clutch, provided the principle of giving an elastic support or bearing to the clutch is adhered to.

The back L of one of the halves of the clutch is made longer than the width of such half, for the purpose of giving the clutch sufficient steadiness on the rod D and of obtaining the proper degree of strength. At the rear end of the hinge of the clutch is placed a ring, K, which likewise is capable of moving endwise on the rod D, but is so connected with said rod that it cannot turn thereon. On the sides of this ring are placed pulleys J J, in whose grooves run chains or cords P', which are fastened at one end to eyes P, on the rear side of the halves of the clutch, their other ends being taken upward into the body of the vehicle or to its platform, within reach of the conductor or other person in charge, to enable him to raise the clutch out of the guide B when the car is to be switched onto another track, or whenever, for any cause, the clutch is to be taken out of the guide.

In order to enable the clutch to be so raised each half is jointed at a convenient point, N, below the hinge, the joints being so made as to permit the lower portions of the switch to be swung or turned up toward the rear of the truck, but not in the opposite direction, as is shown in Figs. 2 and 5.

Springs O are applied to each part of the clutch with their free ends bearing against the jointed portions, so as to close their joints and keep them in proper position for acting on the cable whenever they are not pulled upward by the cords.

Both parts of the clutch are made strong, and the lower portions of each are made nearly semicircular, with diameters that diminish toward the front, so that when the two halves of the clutch are brought together they form nearly a hollow cone, the lower side being open and its wider end being toward the rear of the truck. This wider end is of sufficient diameter to receive within it the ends of heads or ferrules Q, which are placed on the cable at suitable distances apart. These ferrules are double cones united at their bases, the place of their junction being grooved to receive rings R, which relieve the ferrules from contact with the sides of the guide B, in which the cable runs.

The narrow end of the clutch is of less diameter than the ferrules, and consequently, when the parts of the clutch are brought together, as shown in Figs. 4 and 6, the clutch will not permit a ferrule to pass through it, and if the cable be in motion such motion will be imparted through the clutch to the vehicle it is connected with.

Each half of the clutch is independent of the other, both in respect to its lateral motion on the hinge L M and in respect to the movement on its joints N. When the said halves are allowed to swing apart they remain in the guide B, and the ferrules Q are free to pass between them, as shown in Fig. 3, so that the movement of the cable need not be interrupted in order to stop the vehicle or in order to disengage the clutch from the cable.

The clutch is made to engage any of the ferrules by means of pendulous buffers E E, consisting of blocks that extend a suitable distance on each side of the rod D, so as always to be in readiness to act against the halves of the clutch, whatever its position on the rod D may be. In this example the buffers are of an equal length with said rod, and they are suspended by their ends from the front and rear ends of the frame of the truck in such a manner as to swing on each side of the clutch.

The buffers hang vertically when left to themselves, and in that position they swing clear of the clutch, which will then be forced open or separated by the ferrule with which it was engaged, and will continue open to allow the other ferrules of the cable to pass between them without touching, although its halves remain in the guide B.

The buffers are forced inward to close the clutch by means of cams fixed on cam-shafts which extend along and outside of each buffer. The ends of these shafts have their journals in the ends of the frame of the truck, and they are operated or rocked in this example by levers, so as to move their cams against or away from the backs of the buffers at pleasure, according as it is desired to bring the clutch into or out of engagement with the moving cable.

In this construction the gravity of the buffers is relied on to cause them to swing away from and relieve the clutch from lateral pressure; but they may, if desired, be drawn back by positive means, and the device for forcing them against the clutch may also be modified in various ways.

When it is desired to switch a car off a track it becomes necessary to raise the clutch out of the guide B. This is accomplished by means of the joints N, which permit each half of the clutch to be drawn up separately out of the guide when the ropes P' are pulled by the conductor or other operator. When the clutch has been raised clear of the top of the guide the car can be switched off on another track, in the same way as on a common railroad-track, the rails being made as high as or a little higher than the top of the guide, and the switch being laid across and combined with the guide in a similar way to that now followed where one track is intersected by another.

The springs for relieving the vehicle from sudden shocks when it is connected to the cable may be arranged on the other side of the clutch, in which case they must be attached both to the frame of the truck or to the rod D and to the clutch, so that they will draw the clutch in a direction opposite to the direction in which the cable moves.

The springs on rod D may be of any suitable form and character and material, so as to insure strength and permanency, and in case metallic springs are employed the elliptical form will be found advantageous.

It will be observed that the division of the clutch permits it to remain inside of the cable-guide while not engaged with the cable, the cable being allowed to pass through the clutch (when opened) while the car is stationary, or while it is moving at a slower speed than the cable, as when coming to a stop.

The buffers act on the clutch at whatever position it may be on the rod, to which it is hinged, since they extend the whole length of the rod D.

The ferrules are formed of two distinct hollow conical rings brought together and connected by a joint in any convenient way at their bases.

The central portion of each division of the ferrule is hollowed to receive a rubber or other elastic cushion, through whose center the cable is passed, said cable having a collar or flange fixed on it at the point which comes opposite the middle of the ferrule, so that when its two conical divisions are brought together the elastic cushions will embrace the flange, which consequently acts as a head to connect the ferrule and cable to each other, the ferrule consequently having some play on the cable, owing to the elastic cushions confined therein, and its cushions aiding to counteract the jerk to which a car is subjected when it is started, and also enabling the ferrule itself to receive the shock to which it is subjected with less liability to injury. A common spiral spring may be used within the ferrule in place of the rubber.

What I claim as new, and desire to secure by Letters Patent, is—

1. A coupling-clutch for connecting a car or other vehicle or body to a moving cable, which is jointed so as to be capable of opening and releasing the cable, and has its divisions, which clasp the cable or the heads thereof, so shaped as to become of less diameter toward the forward end, substantially as described.

2. Jointing the divisions of that part of a clutch which engage the cable, so that they can be raised separately clear of the cable-guide, substantially as described.

3. A coupling-clutch whose divisions swing on the rod on which the clutch slides, in combination with springs I I' or their equivalents, whereby the clutch and the vehicle are relieved from sudden shocks when connected to a moving cable, substantially as set forth.

4. The pendulous buffers for bringing a clutch into engagement with the cable when the clutch is made in two or more parts, substantially as described.

5. The cam-shafts and their cams G, in combination with the buffers, substantially as shown.

6. Hinging the divisions of a divided clutch upon a rod or shaft parallel with the length of the car or other vehicle to which it is applied, substantially as described.

7. The use of a hollow coupling-clutch, which connects a car or other vehicle to a moving cable by embracing or straddling the cable and its ferrules, in combination with a shaft on which it slides, substantially as described.

8. Placing an elastic cushion or cushions or their equivalents in the interior of the heads or ferrules of a moving cable when such ferrules are jointed, substantially as described.

9. Giving a conical form to that part of the clutch which enters into the cable-guide, so that when it receives one of the ferrules of the cable it lifts it out of frictional contact with the guide, substantially as described.

10. Making the ends of the ferrules of the cable of conical form, substantially as described.

CHARLES. T. HARVEY.

Witnesses:
J. VAN SANTVOORD,
F. A. MORLEY.